Dec. 25, 1962 W. L. STEWART ETAL 3,070,349
MULTISTAGE MULTIPLE-REENTRY TURBINE
Filed April 27, 1960 3 Sheets-Sheet 1

INVENTORS
WARNER L. STEWART
DAVID G. EVANS

BY

ATTORNEY

Dec. 25, 1962  W. L. STEWART ETAL  3,070,349
MULTISTAGE MULTIPLE-REENTRY TURBINE
Filed April 27, 1960  3 Sheets-Sheet 3

INVENTORS
WARNER L. STEWART
DAVID G. EVANS

BY

ATTORNEY

United States Patent Office 3,070,349
Patented Dec. 25, 1962

3,070,349
MULTISTAGE MULTIPLE-REENTRY TURBINE
Warner L. Stewart, Parma, and David G. Evans, Avon Lake, Ohio, assignors to the United States of America as represented by the Administrator of the National Aeronautics and Space Administration
Filed Apr. 27, 1960, Ser. No. 25,175
3 Claims. (Cl. 253—66)
(Granted under Title 35, U.S. Code (1952), sec. 266)

The invention described herein may be manufactured and used by or for the Government of the United States of America for governmental purposes without the payment of any royalties thereon or therefor.

The invention herein disclosed provides a novel multiple-reentry, pressure-staged axial flow turbine.

Previous to this invention, multistage turbines used in the majority of all multistage applications have been either conventional multi-rotor axial or mixed-flow turbines of either full-admission or partial-admission design or of the relatively low efficiency impulse type of reentry turbine such as the Terry turbine. By adding stages to a conventional turbine in order to multistage it, an increase in its specific work output is obtained. However, attendant with the increase in specific work output, the size, weight, complexity, and thus the cost of the turbine is proportionately or greatly increased. An additional disadvantage of the conventional multistage turbine is that there is an increase in the rotating mass of the turbine reducing its acceleration and thus its operational flexibility. Furthermore, the turbine inlet temperature and thus the specific work output is limited by the high temperature properties of existing rotor blading materials or by the practicality of turbine blade cooling. Turbine efficiency also suffers in high specific work turbines because inlet blade heights become quite small.

The novel reentry turbine of this invention provides an efficient means of delivering high specific work output or, in other words, a high work output per unit weight of fluid flowing through it. In principle, the turbine is equivalent to the conventional pressure-staged multistage axial-flow turbine. However, it overcomes the disadvantages that are unique with multistage applications where turbine size, weight, flow, mechanical complexity, and rotor blade temperatures must be minimized while maintaining the highest possible rate of turbine acceleration, turbine inlet temperature, and overall efficiency.

The novel turbine of the invention consists of a single rotor having a plurality of blades circumferentially placed around the periphery of the rotor. An inlet duct is provided to direct the incoming fluid to one side of the rotor blades and serves to keep a supply of fluid within the turbine. After the fluid passes across the rotor blades and work is expended, a reentry duct is provided to receive this outlet stream. The reentry duct then conducts the fluid back to the opposite side of the turbine rotor blades or, in other words, back to the side of the rotor where the inlet duct originally directed the incoming stream. The passage of the incoming fluid from the inlet duct across the blades and into the reentry duct comprises the first stage of the turbine. As can readily be seen, more than one duct may be provided to receive the incoming fluid after it has passed across the rotor blades and such plurality of ducts conduct the partially expended fluid back to the opposite side of the turbine rotor. The reentry duct or plurality of reentry ducts which receive the fluid of the first stage are called second stage reentry ducts since they direct the fluid to the second stage of the turbine. When the reentry ducts comprising the first stage of the turbine direct the fluid back to pass over the rotor blades a second time, additional reentry ducts are provided to receive the partially expended fluid after it makes the second pass over the rotor blades. The reentry ducts that receive the stream after making its second pass at the rotor, again direct the fluid back to the side of the rotor that initially received the inlet fluid, and cause the fluid to make a third pass at the turbine rotor blades. This process of reentry may be repeated continually around the periphery of the turbine rotor until all of the work of the incoming fluid is expended. In the particular application disclosed in this invention there is a three-stage turbine wherein two reentry ducts comprise the second stage reentry ducting and three ducts comprise the third stage reentry ducting.

In view of the aforegoing description, an object of this invention is to provide a multistage axial-flow turbine of relatively small size.

Another object of this invention is to provide a multistage axial-flow turbine of low weight.

An additional object of the invention is to provide multiple-reentry multistage axial-flow turbine having mechanical simplicity.

A further object of the invention is to provide a multiple-reentry multistage axial-flow turbine having a low rotating mass.

Still another object of the invention is to provide a multiple-reentry multistage axial-flow turbine having comparatively low rotor blade operating temperatures for a given turbine-inlet temperature.

A still additional object of the invention is to provide multiple-reentry multistage axial-flow turbine having high operational flexibility.

One other object of the invention is to provide a multiple-reentry multistage axial-flow turbine having high rotor blade heights.

A still further object of the invention is to provide a multiple-reentry multistage axial-flow turbine having high rotative acceleration.

One additional object of the invention is to provide a multiple-reentry multistage axial-flow turbine having a high efficiency.

Other objects and many attendant advantages of the present invention will be apparent from the following detailed description when taken together with the accompanying drawings in which.

Figure 1:
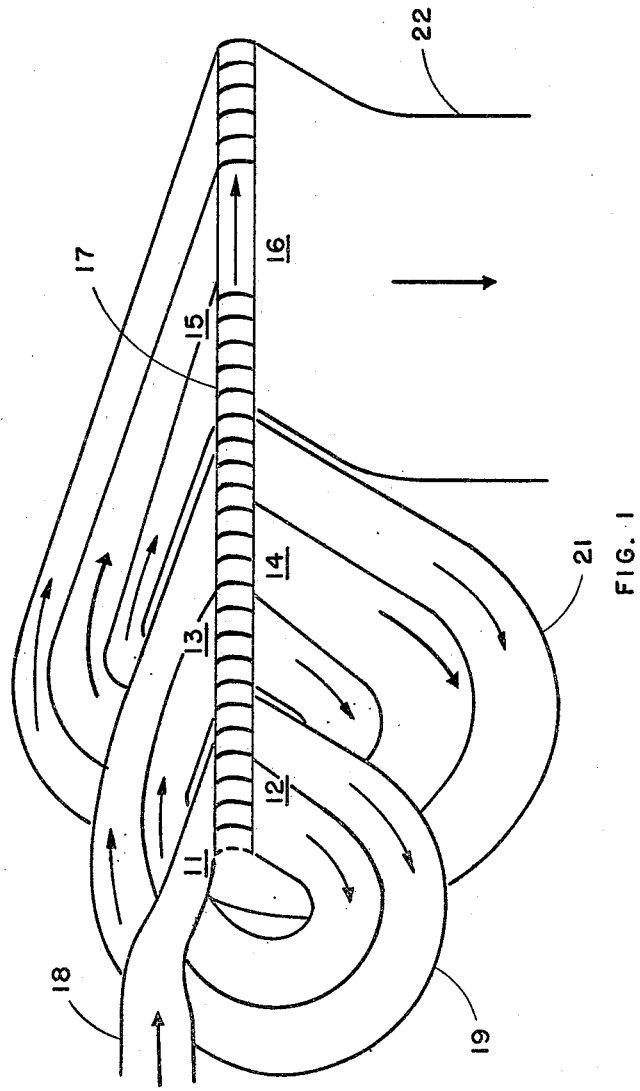
FIG. 1 is a schematic view of the multiple-reentry multistage axial flow turbine.

Referring now to the drawings wherein like reference characters designate like or corresponding parts throughout the several views, there is schematically shown in FIG. 1 a three-stage reentry turbine of full-admission, reaction-staged design wherein the flow enters through the inlet duct 18. The flow then passes through the first-stage segment of the turbine as it passes from station 11 to station 12 crossing the rotor blading 17. The flow is thus discharged into the second-stage reentry ducting 19 being directed from station 12 to the second-stage segment of the turbine at station 13. The flow then passes from station 13 to station 14 across the rotor blading 17 and enters the third stage reentry ducting 21. The partially expended flow is carried in the reentry ducting 21 from station 14 to the third-stage segment of the turbine at station 15. The flow then passes from station 15 to station 16 across the rotor blading 17 and exits from the turbine through the turbine exit ducting 22. As is apparent from the figure, the total cross-sectional area of reentry ducting of each reentry stage increases with each successive stage whereby a greater number of blades are affected in each of the successive stages. Thus, the volume of fluid and ducting is increased with each of these stages. This is necessary for a pressure-staged turbine where the fluid at each stage has the same velocity while the pressure head is being expended. The preferred embodiment shown in FIGS. 2 and 3 of the invention utilizes one inlet duct, two second-stage reentry ducts, and three third-stage reentry ducts. As can be seen, the number of reentry ducts comprising each stage may be varied otherwise than as that shown in the preferred embodiment.

Figure 2:
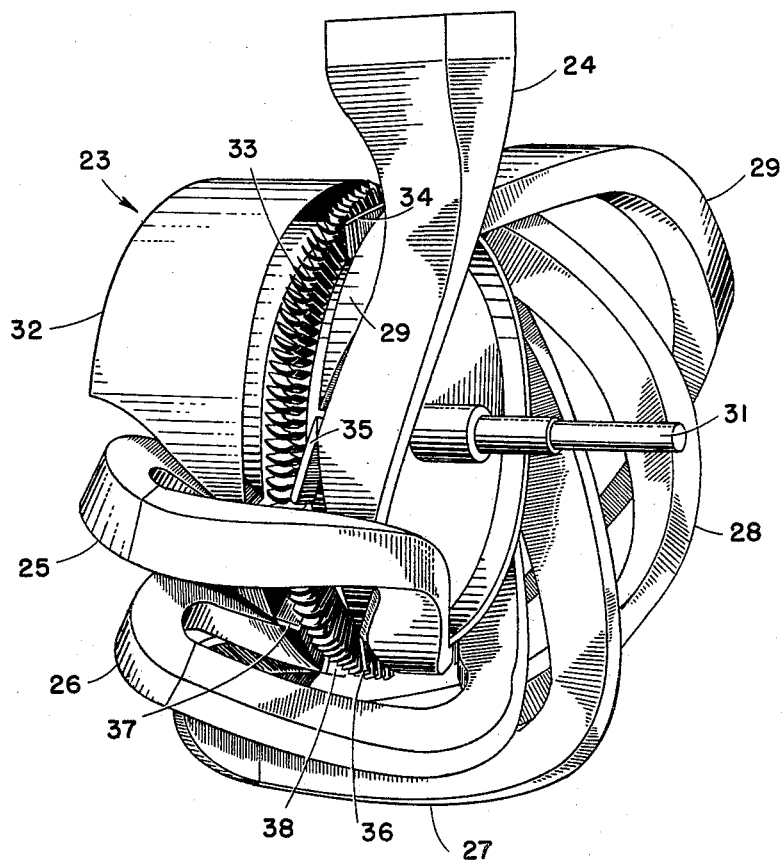
FIG. 2 is a partially-sectioned pictorial frontal view of a multiple-reentry multistage axial-flow turbine.
Figure 3:
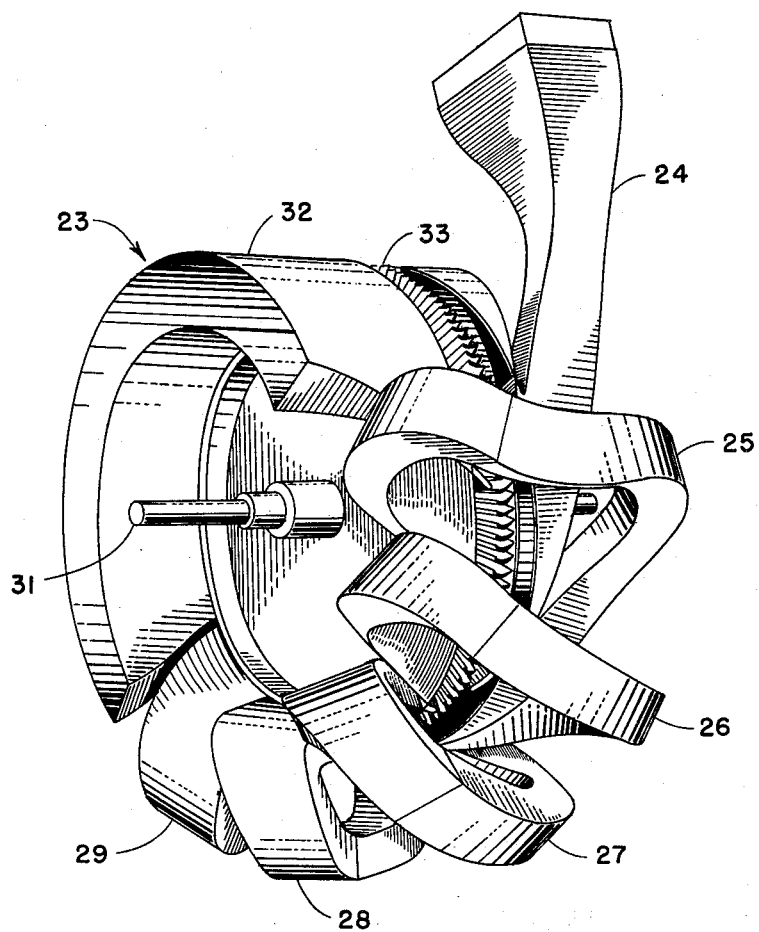
FIG. 3 is the rear view of the turbine shown in FIG. 2.

Referring now to FIGS. 2 and 3, a three-stage multiple-reentry axial-flow turbine 23 is shown having an inlet duct 24 for admitting the incoming fluid. This incoming fluid is directed by the inlet duct 24 to the upstream side of the turbine rotor blading 33. The impingement of the incoming fluid upon the rotor blading 33 is directed by two guide vanes 35 and 36 situated between the end of the inlet 24 and the rotor blading 33. The inlet fluid passing across the turbine blades 33 is received by two reentry ducts 25 and 26. A guide vane 37 separates the two inlets of the respective reentry ducts. As can be seen, the two ducts 25 and 26 comprise the second stage reentry ducting of the turbine 23. The ducts 25 and 26 direct the fluid back to the turbine blading to enter on the upstream side as did the initial fluid from the inlet 24. Ducts 27, 28, and 29 comprise the third stage reentry ducting of the turbine 24. A guide vane 38 serves to separate inlet of duct 26 from the inlet of third stage reentry duct 27. This guide vane 38, as well as guide vane 36, serves to prevent the incoming fluid from inlet 24 from entering any of the third stage reentry ducting. As can be seen, the reentry duct 29 which is one of the three reentry ducts comprising the third stage ducting, brings the fluid back to the upstream side of the turbine and directs it across the rotor blading 33. Said fluid is guided across the blades 33 by means of vanes 34 and 35. The fluid is finally directed to the exit 32 and is exhausted from the turbine 23.

The reentry duct configuration may be otherwise than as specifically shown. However, the particular configuration used has been found to impart the least amount of distortion and loss in total pressure to the flow. Also, the preferred configuration results in a minimum increase in the overall size of the turbine and is quite feasible to construct.

The multiple-reentry multistage turbine of this invention can be used for various applications. The numerous advantages of the instant turbine would be desirable in applications including rocket, torpedo, and automotive drive units or auxiliary power units.

While the particular embodiment of the invention is shown and described, it will be obvious to those skilled in the art that various changes and modifications may be made without departing from the invention in its broadest aspects and, therefore, the aim of the appended claims is to cover all such changes and modifications as fall within the true spirit and scope of the invention.

What is claimed is:

1. In a fluid-driven reaction turbine of the multistage multiple reentry type having a rotor with a plurality of blades thereon for contacting the fluid, the improvement comprising an inlet duct adjacent said rotor and positioned to admit pressurized fluid to the upstream side of said blades, second stage reentry ducts adjacent said rotor and positioned to receive partially-expended fluid from the downstream side of said blades, said second stage reentry ducts being curved from one end adjacent said downstream side to another end adjacent said upstream side to direct said partially-expended fluid to said upstream side, at least one fluid guide vane between said second stage reentry ducts at said one end, said other end of one of said second stage reentry ducts being in substantial juxtaposition with said inlet duct, a fluid guide member between said inlet duct and said other end of said one of said second stage reentry ducts for separating said pressurized fluid from said partially-expended fluid, third stage reentry ducts adjacent said rotor and positioned to receive expended fluid from said blades, said third stage reentry ducts being curved from a first end adjacent said downstream side to a second end adjacent said upstream side, one of said third stage reentry ducts having the first end thereof in substantial juxtaposition with said one end of one of said second stage reentry ducts, another fluid guide vane between said one of said third stage reentry ducts and said one of said second stage reentry ducts at said first end and said one end respectively, a second fluid guide member between said third stage reentry ducts at said second end thereof, one of said third stage reentry ducts having its second end in substantial juxtaposition with said inlet duct, a third fluid guide member between said one of said third stage reentry ducts and said inlet duct, and an exit duct adjacent said rotor and positioned to receive expended fluid from said blades, said exit duct having one side in substantial juxtaposition with said one of said second stage reentry ducts and an opposite side in substantial juxtaposition with one of said third stage reentry ducts.

2. In a multistage multiple-reentry reaction turbine, the combination of a rotor having a plurality of blades thereon, a fluid to drive said rotor, said blades having an upstream side at one side of said rotor and a downstream side at the opposite side of said rotor, an inlet duct adjacent said rotor and positioned to admit the incoming fluid to the upstream side of said rotor whereby said fluid passes over the rotor blading for the first time, second stage reentry duct means adjacent said rotor and positioned to receive the partially-expended fluid at the downstream side of said rotor, said second stage reentry duct means being curved to extend around said blades from said downstream side to said upstream side for directing said fluid back to said upstream side of said rotor blading whereby said fluid passes over said rotor blading for the second time, third stage reentry duct means at the downstream side of the said rotor, said third stage reentry duct means being curved to extend around said blading from said downstream side to said upstream side for receiving the further expended fluid after said fluid has made the second pass over said rotor blading and directing said fluid back to said upstream side of said rotor blading whereby said fluid passes over said rotor blading for the third time, said third stage reentry duct means having a larger total volume than said second stage reentry duct means, and an exit duct adjacent said rotor for receiving the expended fluid after said fluid has made the third pass over said rotor blading and exhausting said expended fluid from said turbine, said exit duct being in substantial juxtaposition with said second stage reentry duct means and said third stage reentry duct means.

3. In a multistage multiple-reentry reaction turbine, the combination of a rotor having a plurality of blades thereon, a fluid to drive said rotor, said blades having an upstream side at one side of said rotor and a downstream side at the opposite side of said rotor, an inlet duct adjacent said rotor and positioned to admit the incoming fluid to the upstream side of said rotor whereby said fluid passes over the rotor blading for the first time, two second stage reentry ducts adjacent said rotor for receiving the partially-expended fluid at the downstream side of said rotor, said second stage reentry ducts being curved to extend around said blades from said downstream side to said upstream side for directing said fluid back to said upstream side of said rotor blading whereby said fluid passes over said rotor blading for the second time, three third stage reentry ducts adjacent said rotor for receiving the expended fluid after said fluid has made the second pass over said rotor blading at the downstream side of said rotor, said third stage reentry ducts being in substantial juxtaposition with said second stage reentry ducts, each of said third stage reentry ducts being curved to extend around said rotor blading from said downstream side to said upstream side for directing said fluid back to said upstream side of said rotor blading whereby said fluid passes over said rotor blading for the third time, all of said reentry ducts being arranged in succession around the periphery of said rotor, said third stage reentry ducts having a larger total volume than said second stage reentry ducts, and an exit duct adjacent said rotor for receiving the expended fluid after said fluid has made the third pass over said rotor blading and exhausting said expended fluid from said turbine, said exit duct being in substantial juxtaposition with said second stage reentry ducts and said third stage reentry ducts.

References Cited in the file of this patent

UNITED STATES PATENTS

| | | |
|---|---|---|
| 731,009 | Zahikjanz | June 16, 1903 |
| 742,972 | Daw | Nov. 3, 1903 |
| 816,020 | Lentz | Mar. 27, 1906 |
| 842,211 | Kolb | Jan. 29, 1907 |
| 911,576 | Dake | Feb. 9, 1909 |
| 923,146 | Curtis | June 1, 1909 |
| 1,137,591 | Ehrhart | Apr. 27, 1915 |
| 1,161,436 | Banner | Nov. 23, 1915 |
| 2,419,689 | McClintock | Apr. 29, 1947 |

FOREIGN PATENTS

| | | |
|---|---|---|
| 128,026 | Australia | July 1, 1948 |
| 443,613 | Italy | Dec. 29, 1948 |
| 833,044 | Germany | Mar. 3, 1952 |
| 933,363 | Germany | Aug. 25, 1955 |